(12) United States Patent
Lauter et al.

(10) Patent No.: US 8,731,187 B2
(45) Date of Patent: May 20, 2014

(54) COMPUTING GENUS-2 CURVES USING GENERAL ISOGENIES

(75) Inventors: Kristen Lauter, Redmond, WA (US); Damien Robert, Metz (FR)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 12/973,918

(22) Filed: Dec. 21, 2010

(65) Prior Publication Data

US 2014/0105386 A1    Apr. 17, 2014

(51) Int. Cl.
*H04L 9/28* (2006.01)
(52) U.S. Cl.
USPC ............... 380/28; 726/1; 713/176; 713/180; 380/30; 380/44
(58) Field of Classification Search
USPC .......................................................... 380/28
See application file for complete search history.

(56) References Cited

U.S. PATENT DOCUMENTS

| | | | | |
|---|---|---|---|---|
| 5,479,590 | A * | 12/1995 | Lin | 345/611 |
| 7,079,650 | B1 * | 7/2006 | Knudsen | 380/30 |
| 2003/0081771 | A1 * | 5/2003 | Futa et al. | 380/30 |
| 2006/0120528 | A1 | 6/2006 | Weng | |
| 2006/0206554 | A1 * | 9/2006 | Lauter et al. | 708/492 |
| 2007/0053506 | A1 * | 3/2007 | Takashima | 380/28 |
| 2007/0098150 | A1 * | 5/2007 | Lauter et al. | 380/28 |
| 2007/0165846 | A1 * | 7/2007 | Lauter et al. | 380/46 |
| 2008/0084997 | A1 | 4/2008 | Lauter et al. | |
| 2009/0290705 | A1 | 11/2009 | Lauter et al. | |
| 2010/0111296 | A1 * | 5/2010 | Brown et al. | 380/28 |
| 2010/0172491 | A1 * | 7/2010 | Broker et al. | 380/28 |

OTHER PUBLICATIONS

Lauter, et al., "Computing Genus 2 Curves from Invariants on The Hilbert Moduli Space", Retrieved at <<http://eprint.iacr.org/2010/294.pdf >>, IACR Eprint, 2010, pp. 1-24.
McGuire, Gary., "Genus 2 Curves of p-Rank 1 via CM Method", Retrieved at <<http://iml.univ-mrs.fr/ati/GeoCrypt2009/slides/G.McGuire.pdf >>, Apr. 2009, pp. 28.

(Continued)

*Primary Examiner* — Morshed Mehedi
(74) *Attorney, Agent, or Firm* — Dan Choi; Sade Fashokun; Micky Minhas (57) ABSTRACT

An Igusa class polynomial over rational numbers is computed from a set of Igusa class polynomials modulo a set of small primes. The set of Igusa class polynomials modulo a set of small primes is computed by finding all of the maximal curves in the isogeny class for each of the small primes. In particular, for each prime number in a set of prime numbers, a curve in the isogeny class for the prime number is identified, for example through a random search. Given a curve in this isogeny class, isogenies of general degree are applied to the identified curve, until an initial maximal curve, i.e., a curve with a maximal endomorphism ring, is found in this isogeny class. After an initial maximal curve in the isogeny class is found, all other maximal curves in this isogeny class are found by applying isogenies of general degree to the initial maximal curve. This set of maximal curves for the set of prime numbers defines set of Igusa class polynomials modulo the small primes. A Chinese remainder approach is then applied to construct an Igusa class polynomial over the rational numbers from the computed set of Igusa class polynomials modulo the small primes.

20 Claims, 8 Drawing Sheets

(56) References Cited

OTHER PUBLICATIONS

Bruinier, et al., "CM-Values of Hilbert Modular Functions", Retrieved at <<http://www.math.wisc.edu/~thyang/BY1h.pdf >>, Inventiones Mathematicae, 2006, pp. 1-53.

Eisenträger, et al., "A CRT Algorithm for Constructing Genus 2 Curves over Finite Fields", Retrieved at <<http://arxiv.org/PS_cache/math/pdf/0405/0405305v2.pdf>>, 2007, pp. 1-16.

Freeman, et al., "Computing Endomorphism Rings of Jacobians of Genus 2 Curves over Finite Fields", Retrieved at <<http://research.microsoft.com/en-us/um/people/klauter/endomorphisms-postarxiv.pdf >>, 4th Symposium on Stochastic Algorithms, Foundations, and Applications, Sep. 13-14, 2007, pp. 1-27.

Gaudry, et al., "The 2-Adic CM Method for Genus 2 Curves with Application to Cryptography", Retrieved at <<http://www.loria.fr/~gaudry/publis/asiacrypt06.pdf >>, 12th International Conference on the Theory and Application of Cryptology and Information Security, Dec. 3-7, 2006, pp. 16.

Goren, et al., "Genus 2 Curves with Complex Multiplication", Retrieved at <<http://arxiv.org/PS_cache/arxiv/pdf/1003/1003.4759v1.pdf >>, Mar. 24, 2010, pp. 1-51.

Grundman, et al., "Igusa Class Polynomials, Embeddings of Quartic CM Fields, and Arithmetic Intersection Theory", Retrieved at <<http://arxiv.org/PS_cache/arxiv/pdf/1006/1006.0208v1.pdf >>, Jun. 1, 2010, pp. 1-27.

Lenstra, et al., "A Hyperelliptic Smoothness Test II", Retrieved at <<http://cr.yp.to/bib/2002/lenstra-hecm.pdf >>, 1999, pp. 105-146.

Shimura, Goro., "Abelian Varieties with Complex Multiplication and Modular Functions", Retrieved at <<http://www.ams.org/journals/bull/1999-36-03/S0273-0979-99-00784-3/S0273-0979-99-00784-3.pdf >>, American Mathematical Society, vol. 36, No. 3, Apr. 27, 1999, pp. 405-408.

Streng, Theodorus Cornelis., "Complex Multiplication of Abelian Surfaces", Retrieved at <<http://www.math.leidenuniv.nl/~streng/thesis.pdf >>, 1982, pp. 197.

Wamelen, Paul Van., "Examples of Genus two CM Curves Defined over the Rationals", Retrieved at <<http://www.ams.org/journals/mcom/1999-68-225/S0025-5718-99-01020-0/S0025-5718-99-01020-0.pdf >>, Mathematics of Computation, vol. 68, No. 225, Jan. 1999, pp. 307-320.

Weng, Annegret., "Constructing Hyperelliptic Curves of Genus 2 Suitable for Cryptography", Retrieved at <<http://www.ams.org/journals/mcom/2003-72-241/S0025-5718-02-01422-9/S0025-5718-02-01422-9.pdf >>, Mathematics of Computation, vol. 72, No. 241, May 3, 2002, pp. 435-458.

Yang, Tonghai., "An Arithmetic Intersection Formula on Hilbert Modular Surfaces", Retrieved at <<http://www.math.wisc.edu/~thyang/m=1f.pdf >>, American Journal of Mathematics, vol. 132, No. 5, Oct. 2010, pp. 1-30.

Yang, Tonghai., "Arithmetic Intersection on a Hilbert Modular Surface and the Faltings Height", Retrieved at <<http://arxiv.org/PS_cache/arxiv/pdf/1008/1008.1854v1.pdf >>, Aug. 11, 2010, pp. 1-47.

Broker, et al., "Explicit Cm-Theory in Dimension 2", Retrieved at <<http://www.math.brown.edu/~reinier/explicitcm.pdf >>, 2009, pp. 1-22.

* cited by examiner

COMPUTING GENUS-2 CURVES USING GENERAL ISOGENIES

BACKGROUND

One of the challenges in the field of cryptography is to encrypt data in a way that is hard to decrypt for someone who does not have secret information, commonly called a key. One class of techniques for encryption involves using what are called "hyperelliptic curves," which are curves defined using advanced, abstract mathematics. This kind of encryption and decryption uses keys that are generated using characteristics of a hyperelliptic curve.

A hyperelliptic curve can be defined by a group of points which are mathematically related. In practice, the derivative (called a "Jacobian") of the hyperelliptic curve is used to specify the curve, and the points on this Jacobian are the group of points. A point P in this group is multiplied by a key N, which is the secret information. While the point P is known, and the product of N and P is known, N is difficult to determine from this information. The simplest type of hyperelliptic curve is called an elliptical curve, which are also called "genus 1" curves. A more complex hyperelliptic curve is called a "genus 2" curve.

To create a genus 2 curve useful for cryptography, three auxiliary polynomials with rational coefficients are computed. From these, the genus 2 curve is computed. These auxiliary polynomials are called Igusa class polynomials. Computation of Igusa class polynomials is very difficult and computationally expensive, and typically is done through an exhaustive search of possible solutions given some starting values.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The curve generation technique described herein provides a faster way of constructing a genus 2 curve for use in cryptography. More specifically, an Igusa class polynomial over rational numbers is computed from a set of Igusa class polynomials modulo a set of small primes. The set of Igusa class polynomials modulo a set of small primes is computed by finding all of the maximal curves in the isogeny class for each of the small primes. In particular, for each prime number in a set of prime numbers, a characteristic Frobenius polynomial is computed for the prime number, which defines an isogeny class for the prime number. A curve in the isogeny class for the prime number is identified, for example through a random search. Given a curve in this isogeny class, isogenies of general degree are applied to the identified curve, until an initial maximal curve, i.e., a curve with a maximal endomorphism ring, is found in this isogeny class. After an initial maximal curve in the isogeny class is found, all other maximal curves in this isogeny class are found by applying isogenies of general degree to the initial maximal curve. This set of maximal curves for the set of prime numbers defines a set of Igusa class polynomials modulo the small primes. A Chinese remainder approach is then applied to construct an Igusa class polynomial over the rational numbers from the computed set of Igusa class polynomials modulo the small primes. After the set of 3 Igusa class polynomials over the rational numbers is computed, it can be used to generate a genus 2 curve, which in turn can be used to generate a cryptographic key if desired.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

In the following description of the cryptographic curve generation technique, reference is made to the accompanying drawings, which form a part thereof, and which show by way of illustration examples by which the cryptographic curve generation technique described herein may be practiced. It is to be understood that other embodiments may be utilized and structural changes may be made without departing from the scope of the claimed subject matter.

The following section provides an example operating environment in which the cryptographic curve generation technique can be practiced, an explanation of the technique, example processes employing the technique, and an example architecture wherein the cryptographic curve generation technique can be practiced. Details of complex mathematical computations, theorems and proofs are provided in Appendix A of U.S. Patent Publication 2010/0172491, which is hereby incorporated by reference.

The curve generation technique described herein creates a curve that can be used for cryptographic applications. For example, the technique can be used to create a cryptographic key for cryptographic applications.

The curve-based encryption and decryption illustrated as an example herein refers to encryption and decryption that uses keys that are generated based on aspects or characteristics of a mathematical group that defines a hyperelliptic curve. In the case of the cryptographic curve generation technique described herein, the group is a set of points of a Jacobian of a genus 2 curve.

Curve-based cryptosystems can be used to encrypt any of a wide variety of information. For example, the following paragraphs describe an example cryptosystem with respect to generation of a "short" signature or product identifier, which is a code that allows validation and/or authentication of a machine, program or user, for example. The signature can be a "short" signature in that it uses a relatively small number of characters.

Figure 1:
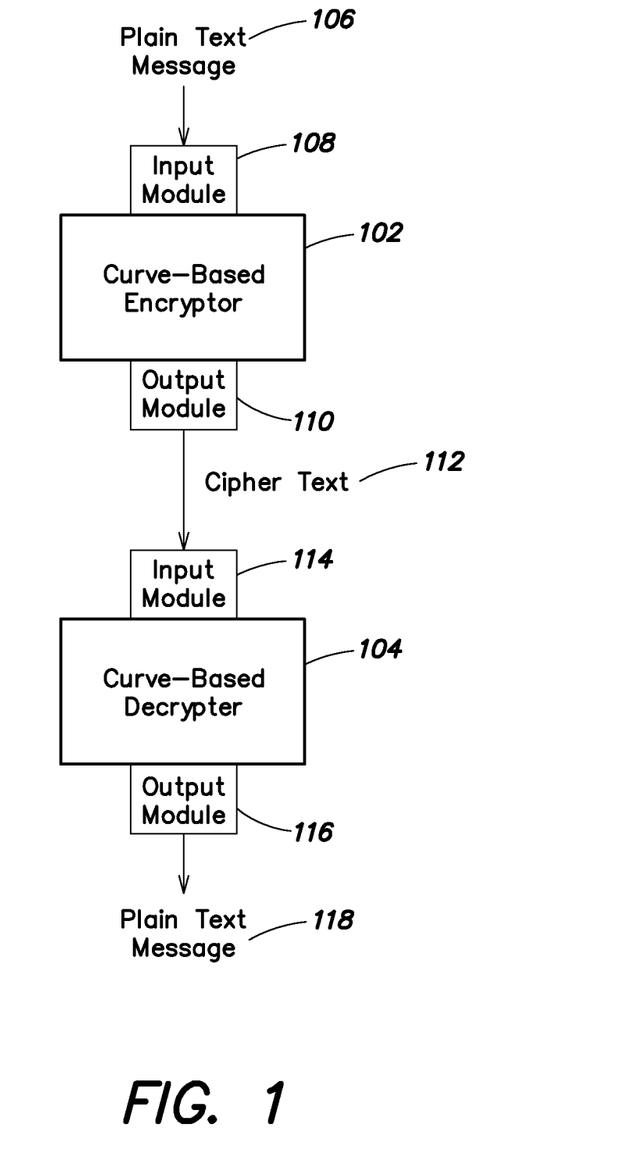
FIG. 1 is a block diagram illustrating an example cryptosystem in which a cryptographic curve generation technique can be practiced.

With this in mind, reference is made to FIG. 1, which is a block diagram illustrating an example cryptosystem 100 in accordance with certain embodiments of the cryptographic curve generation technique described herein. Cryptosystem 100 includes a curve-base encryptor 102 and a curve-based decryptor 104. A plaintext message 106 is received at an input module 108 of encryptor 102, which is a curve-based encryptor that encrypts message 106 based on a public key generated based on secret information (known only by decryptor 104) related to a genus 2 curve. Plaintext message 106 is typically an unencrypted message, although encryptor 102 can encrypt any type of message. Thus, message 106 may alternatively be encrypted or encoded by some other component (not shown) or a user. Message 106 may need to be converted to a divisor before encryption and un-converted after decryption (not shown).

An output module 110 of encryptor 102 outputs the encrypted version of plaintext message 106, which is ciphertext 112. Ciphertext 112 can then be communicated to decryptor 104, which can be implemented, for example, on a computer system remote from a computer system on which encryptor 102 is implemented. Given the encrypted nature of ciphertext 112, the communication link between encryptor 102 and 104 need not be secure. The communication link can be any of a wide variety of public and/or private networks implemented using any of a wide variety of conventional public and/or proprietary protocols, and including both wired and wireless implementations. Additionally, the communication link may include other non-computer network components, such as hand-delivery of media including ciphertext or other components of a product distribution chain.

Decryptor 104 receives ciphertext 112 at input module 114 and, being aware of the secret information used to encrypt message 106 (as well as the exponent), is able to readily decrypt ciphertext 112 to recover the original plaintext message 106, which is output by output module 116 as plaintext message 118. Decryptor 104 is a curve-based decryptor that decrypts the message based on the secret information related to a curve (in the case of the present cryptographic curve generation technique this is a genus 2 curve). The secret information used by the decryptor is the same as the secret information used by the encryptor 102.

As mentioned above, encryption and decryption are performed in cryptosystem 100 based on secret information related to a curve. This secret information is known to decryptor 104, and a public key generated based on the secret is known to encryptor 102. This knowledge allows encryptor 102 to encrypt a plaintext message that can be decrypted only by decryptor 104. Other components, including encryptor 102, which do not have knowledge of the secret cannot decrypt the ciphertext (although decryption may be technically possible, it is not computationally feasible). Similarly, decryptor 104 can also generate a message using the secret information and based on a plaintext message, a process referred to as digitally signing the plaintext message. This signed message can then be communicated to other components, such as encryptor 102, which can in turn verify the digital signature based on the public key.

Figure 2:
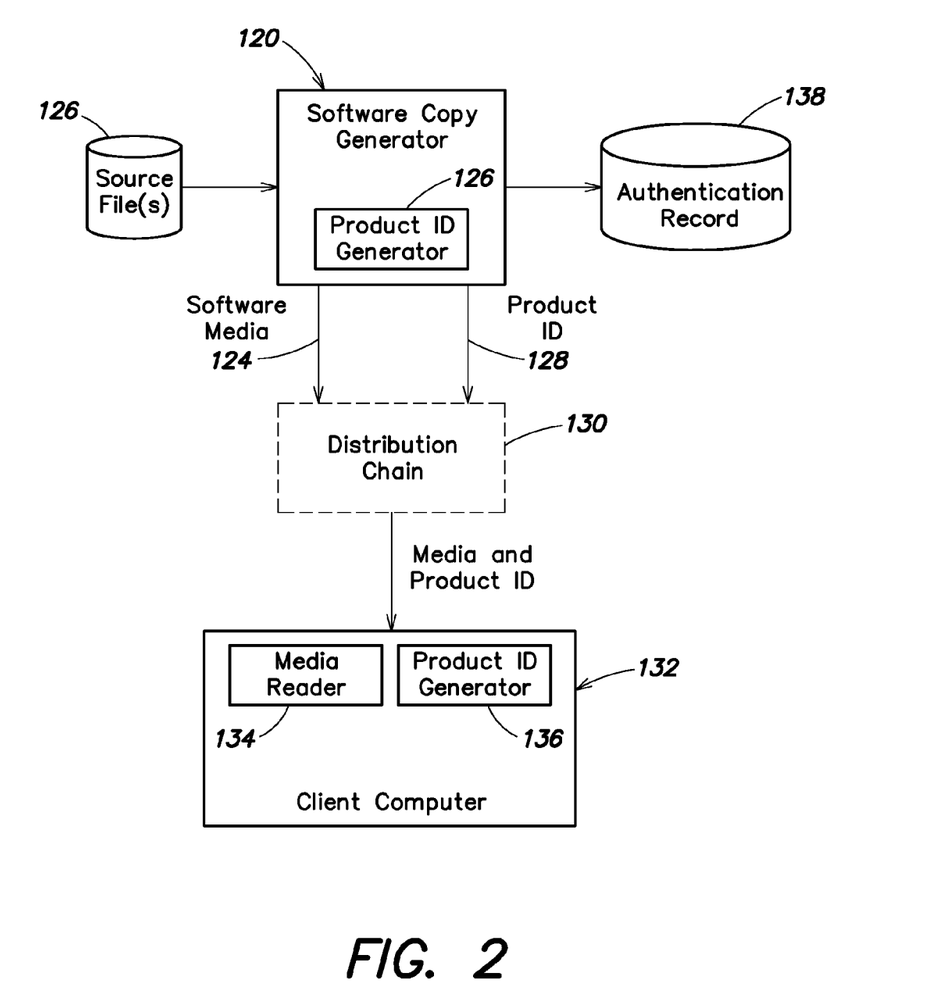
FIG. 2 illustrates an example system using a product identifier to validate software in which example embodiments of the cryptographic curve generation technique can be practiced.

FIG. 2 illustrates an example system using a product identifier to validate software in which one embodiment of the present cryptographic curve generation technique can be practiced. FIG. 2 illustrates a software copy generator 120 including a product identifier (ID) generator 122. Software copy generator 120 produces software media 124 (e.g., a CD-ROM, DVD (Digital Versatile Disk), etc.) that contains typically all the files needed to collectively implement a complete copy of one or more application programs, (e.g., a word processing program, a spreadsheet program, an operating system, a suite of programs, and so forth). These files are received from source files 126, which may be a local source (e.g., a hard drive internal to generator 120), a remote source (e.g., coupled to generator 120 via a network), or a combination thereof. Although only a single generator 120 is illustrated in FIG. 2, typically multiple such generators operate individually and/or cooperatively to increase the rate at which software media 124 can be generated.

Product ID generator 122 generates a product ID 128 that can include numbers, letters, and/or other symbols. Generator 122 generates product ID 128 using the curve-based encryption process described herein. The product ID 128 is typically printed on a label and affixed to either a carrier containing software media 124 or a box into which software media 124 is placed. Alternatively, the product ID 128 may be made available electronically, such as a certificate provided to a user when receiving a softcopy of the application program via an on-line source (e.g., downloading of the software via the Internet). The product ID can serve multiple functions. First, the product ID can be cryptographically validated in order to verify that the product ID is a valid product ID (and thus allowing, for example, the application program to be installed). Additionally, the product ID can optionally serve to authenticate the particular software media 124 to which it is associated.

The generated software media 124 and associated product ID 128 are then provided to a distribution chain 130. Distribution chain 130 represents any of a variety of conventional distribution systems and methods, including possibly one or more "middlemen" (e.g., wholesalers, suppliers, distributors, retail stores (either on-line or brick and mortar), etc.). Regardless of the manner in which media 124 and the associated product ID 128 are distributed, eventually media 124 and product ID 128 are purchased (e.g., licensed), by the user of a client computer 132.

Client computer 132 includes a media reader 134 capable of reading software media 124 and installing the application program onto client computer 132 (e.g., installing the application program on to a hard disk drive (not shown) of client computer 132). Part of this installation process involves entry of the product ID 128. This entry may be a manual entry (e.g., the user typing in the product ID via a keyboard), or alternatively an automatic entry (e.g., computer 132 automatically accessing a particular field of a license associated with the application program and extracting the product ID therefrom). Client computer 132 also includes a product ID validator 136 which validates, during installation of the application program, the product ID 128. This validation is performed using the curve-based decryption techniques, for example, as described herein.

If validator 136 determines that the product ID is valid, then an appropriate course of action is taken (e.g., an installation program on software media 124 allows the application to be installed on computer 132). However, if validator 136 determines that the product ID is invalid, then a different course of action is taken (e.g., the installation program terminates the installation process preventing the application program from being installed).

Product ID validator 136 also optionally authenticates the application program based on the product ID 128. This authentication verifies that the product ID 128 entered at computer 132 corresponds to the particular copy of the application be accessed. The authentication can be performed at different times, such as during installation, or when requesting product support or an upgrade. Alternatively, this authentication may be performed at a remote location (e.g., at a call center when the user of client computer 132 calls for technical support, the user may be required to provide the product ID 128 before receiving assistance).

If the application program manufacturer desires to utilize the authentication capabilities of the product ID, then the product ID generated by generator 122 for each copy of an application program is unique. This uniqueness is created by assigning a different initial number or value to each copy of the application program. This initial value can then be used as a basis for generating the product ID.

The unique value associated with the copy of the application program can be optionally maintained by the manufacturer as an authentication record 138 (e.g., a database or list) along with an indication of the particular copy of the application program. This indication can be, for example, a serial number embedded in the application program or on software media 124, and may be hidden in any of a wide variety of conventional manners.

Alternatively, the individual number itself may be a serial number that is associated with the particular copy, thereby allowing the manufacturer to verify the authenticity of an application program by extracting the initial value from the product ID and verifying that it is the same as the serial number embedded in the application program or software media 124.

Appropriate action can be taken based on whether the product ID is authenticated. These actions can vary, depending on the manufacturer's desires and/or action being taken at computer 132 that caused the authentication check to occur. For example, if a user is attempting to install an application program then installation of the program may be allowed only if the authentication succeeds. By way of another example, the manufacturer's support technicians may provide assistance to a user of computer 132 only if the authentication succeeds, or an upgrade version of the application program may be installed only if authentication of the previous version of the application program succeeds.

Figure 3:
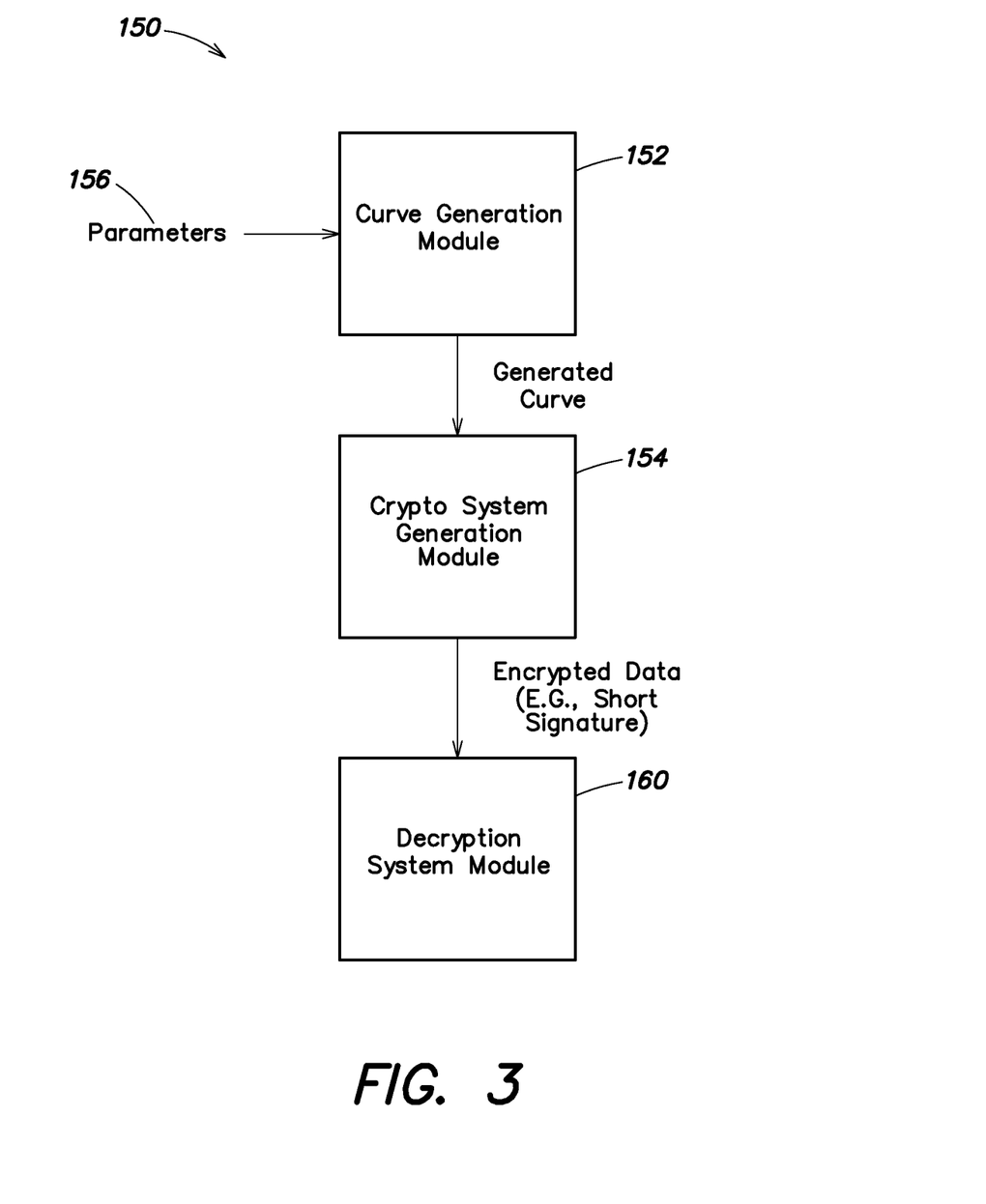
FIG. 3 illustrates an example cryptographic system generator in which example embodiments of the cryptographic curve generation technique can be practiced.

FIG. 3 illustrates an example cryptographic system generator in accordance with certain embodiments of the cryptographic curve generation technique. The generator system 150 generates a cryptosystem based on a secret related to a genus 2 curve. The cryptosystem generated by system 150 can be used, for example, to implement the system 100 in FIG. 1 or the product ID based system of FIG. 2. The system 150 includes a curve generation module 152 and a cryptographic system generation module 154. Curve generation module 152 receives a set of one or more parameters 156 as inputs and creates a curve to be used based on the parameters 156. In one embodiment, parameters 156 include an indication of the genus of the curve and a size (e.g., in bits) of the product identifier. Curve generation module 152 can then generate a genus-2 curve based on these parameters as will be discussed in greater detail below. Curve generation module 152 then provides the generated genus 2 curve to cryptographic system generation module 154. Cryptographic system generation module 154 generates the cryptographic system, by determining the group of points on the Jacobian of the curve, the value of the secret information N, and the point P from which the product of N and P is computed.

For illustration purposes, a decrypt system module 160 is also depicted as receiving the short signature as input and performing the counterpart to crypto system generation module 154. The curve generated by the cryptographic curve generation technique can be used with any type of curve-based encryption and decryption protocol.

Curve generation module 152 can be configured to create a genus 2 curve given by $y^2=f(x)$, referred to herein as the equation C, over a finite field $F_p$, where p is a prime number and where $f(x)$ is a polynomial of degree $2g+1$ and g is the genus of the genus 2 curve. Given this generated curve, cryptographic system generation module 154 determines the Jacobian $J(C)$ over the finite field $F_p$ for the curve. The group of points on the Jacobian $J(C)$ is denoted by $J(C)(F_p)$. The order of $J(C)(F_p)$ is the size of $J(C)(F_p)$ or the number of elements in $J(C)(F_p)$. The order of $J(C)(F_p)$ can be selected by the cryptosystem designer and made available to cryptosystem generation module 154 (e.g., as one of parameters 156, or alternatively separately). An element of the group $J(C)$ is called a divisor on the curve, and it is given as a pair of polynomials $a(x)$ and $b(x)$.

For example, let q be an odd prime or prime power and $F_p$ denote the finite field of q elements. If g is a positive integer, for example, then a genus 2 curve can be given as an equation $y^2=f(x)$ over $F_p$, where the degree of $f(x)$ is $2g+1$ or $2g+2$ and $f(x)$ has no repeated factors. Then g is called the genus of the curve. Assume for simplicity that the degree of $f(x)$ is $2g+1$ for the remainder of this explanation. Elements of the Jacobian of the curve are degree-zero divisors, and can be represented by two polynomials $a(x)$, $b(x)$ in $F_q[x]$ such that:

$$\text{degree}(b) < \text{degree}(a) \leq g; \text{ and} \tag{1}$$

$$a(x) \text{ divides } f(x) - b(x)^2 \tag{2}$$

For ease of understanding, an element of the Jacobian of a curve can be thought of as a multiset with at most g points on the curve, where g is the genus of the curve. These points on the curve can lie in an algebraic extension of the finite field, and the multiset never includes both a point and its negative. The generation of the Jacobian of a curve and performing operations in the Jacobian are well-known to those skilled in the art.

The above paragraphs having been dedicated to explaining how curves are used to generate a group for use in cryptography, the following section will be dedicated to an explanation of generating a suitable genus 2 curve for cryptography in accordance with some embodiments of the cryptographic curve generation technique described herein.

As discussed above, in one example embodiment of the technique, curve generation can take place in a curve generation module, such as, for example, curve generation module 152. The present cryptographic curve generation technique provides a faster way of constructing a genus 2 curve for use in cryptography. Although the properties of genus 2 curves are well suited for cryptography, some curves are better than others. The technique makes it easier to find a 'good curve' that can be used for cryptography. The following paragraphs provide an overview of how the technique generates curves. In particular, the following paragraphs provide an explanation of how a set of Igusa class polynomials are expediently computed and used to generate a genus 2 curve.

By way of background, all known methods to construct a genus 2 curve for cryptographic purposes rely on the computation of three auxiliary polynomials with rational coefficients. These polynomials have the form $X^i + a_{(i-1)} X^{(i-1)} + \ldots + a_1 X + a_0$, where $a_x$ are fractions and where i is a positive whole number determined by desired characteristics of the curve to be generated, and is typically about 10. In order to generate a genus 2 curve for use with cryptography the mathematical problem that needs to be solved is the computation of these three polynomials. Traditionally, these polynomials are called Igusa class polynomials. Computation of Igusa class polynomials is very computationally expensive.

The cryptographic curve generation technique described herein speeds up the computation of Igusa class polynomials. It computes the polynomials 'modulo various primes' and then combines the information modulo primes to recover the Igusa class polynomial itself.

The combining method which is employed in one embodiment of the cryptographic curve generation technique is called the Chinese remaindering approach. The Chinese remaindering approach uses various remainders in order to find missing elements in a set of equations. This can be illustrated as follows. Suppose that one has a positive number x of which one knows three things: it is less than 20, if one divides it by 3 then the remainder is 2, and if one divides it by 7 then the remainder is 4. It is possible to compute x using the following method. The fact that the remainder upon division by 3 is 2, means that x is either 2, 5, 8, 11, 14, 17 or 19. However, the fact that the remainder upon division by 7 is 4 means that x is either 4, 11 or 18. It can be seen that the only number that appeared in both lists is 11, so x had to be 11. This method is called the 'Chinese remainder approach'. Instead of computing the 3 Igusa class polynomials, the technique employs the Chinese remaindering approach and computes each of the Igusa class polynomials modulo a prime in order to generate a suitable genus 2 curve for use with cryptography. In practice, such a polynomial modulo a prime p looks like $X^5 + aX^4 + bX^3 + dX^2 + eX + f$. The coefficients a, b, c, d, e, f are not fractions anymore. These coefficients are now integers between 0 and p−1. For a given prime p, the technique finds these coefficients a, b, c, d, e, and f.

Therefore, to reiterate, one wants to construct a genus 2 curve that can be used for cryptography. By well-known mathematical techniques, this reduces to computing three Igusa class polynomials. And by the Chinese remainder approach, this further reduces to computing an Igusa class polynomial modulo a prime.

The curve generation technique described herein computes these polynomials modulo a prime by computing the roots of the above-described polynomials. A root is an integer r between 0 and p−1 with the following property: if one substitutes X=r in the above polynomial, then the result is zero. In other words, if the Igusa class polynomial equals $X^5 + aX^4 + bX^3 + dX^2 + eX + f$, then r is an integer that satisfies $r^5 + ar^4 + br^3 + dr^2 + er + f = 0$. It is well known that if one knows all of the roots r—there are 5 of them in the above example—then one can compute the coefficients a, b, c, d, e, f of the polynomial. Explicitly, if the roots are $r_1, r_2, r_3, r_4, r_5$, then one has $$X^5 + aX^4 + bX^3 + dX^2 + eX + f = (X - r_1)(X - r_2)(X - r_3)-(X - r_4)(X - r_5).$$

The original idea of using Chinese remaindering tried to find all the roots by a 'random search'. This is quite slow: one has to try many values for r and see if they are a root. Instead of searching for all of the roots, it is possible to perform a random search to find one curve in an isogeny class for a prime number, from which the first root can be derived. By reducing the amount of random searching, the amount of computation is significantly reduced. Once the one root is found, advanced mathematics (mathematical detail described in Appendix A, Section A.5 and A.6, and in particular Algorithms 5.2 and 6.2 of U.S. Patent Publication 2010/0172491) are used to find the other roots. However, such algorithms use isogenies of degree 3, whereas in this case the isogenies that are applied can be of general degree.

The following paragraphs explain how the technique can find the other roots of an Igusa class polynomial given one root. More specifically, given a root r of an Igusa class polynomial modulo a prime, the technique computes the other roots. The technique employs isogenies in order to solve this problem. Every root r is associated to a genus 2 curve, and the roots—or the corresponding curves—are related by isogenies. An isogeny is a mathematical object; it is the natural map between two genus 2 curves. The technique uses these isogenies to 'move' from one root to the next root. The technique employs an extremely efficient, novel way to compute these isogenies. Experts in this field know that there is in principle a way of doing this, but this is approach is not computable. In other words, although there is a theoretical method to compute isogenies, this theoretical method does not work in practice. It would take many years to compute even one example. The technique described herein bypasses this obstruction. It first moves from the root r of an Igusa class polynomial to a root r' of a different polynomial. This root r' corresponds to a genus 2 curve with additional structure representing additional points on the genus 2 curve. For this curve with additional structure, the technique can compute an isogeny. This yields another genus 2 curve with additional structure, and it corresponds to a root s' of a polynomial. The technique then maps this root s' to a root s of the Igusa class polynomial. To find all the roots of the Igusa class polynomial, the technique applies this core algorithm many times: once for every root.

Figure 4:
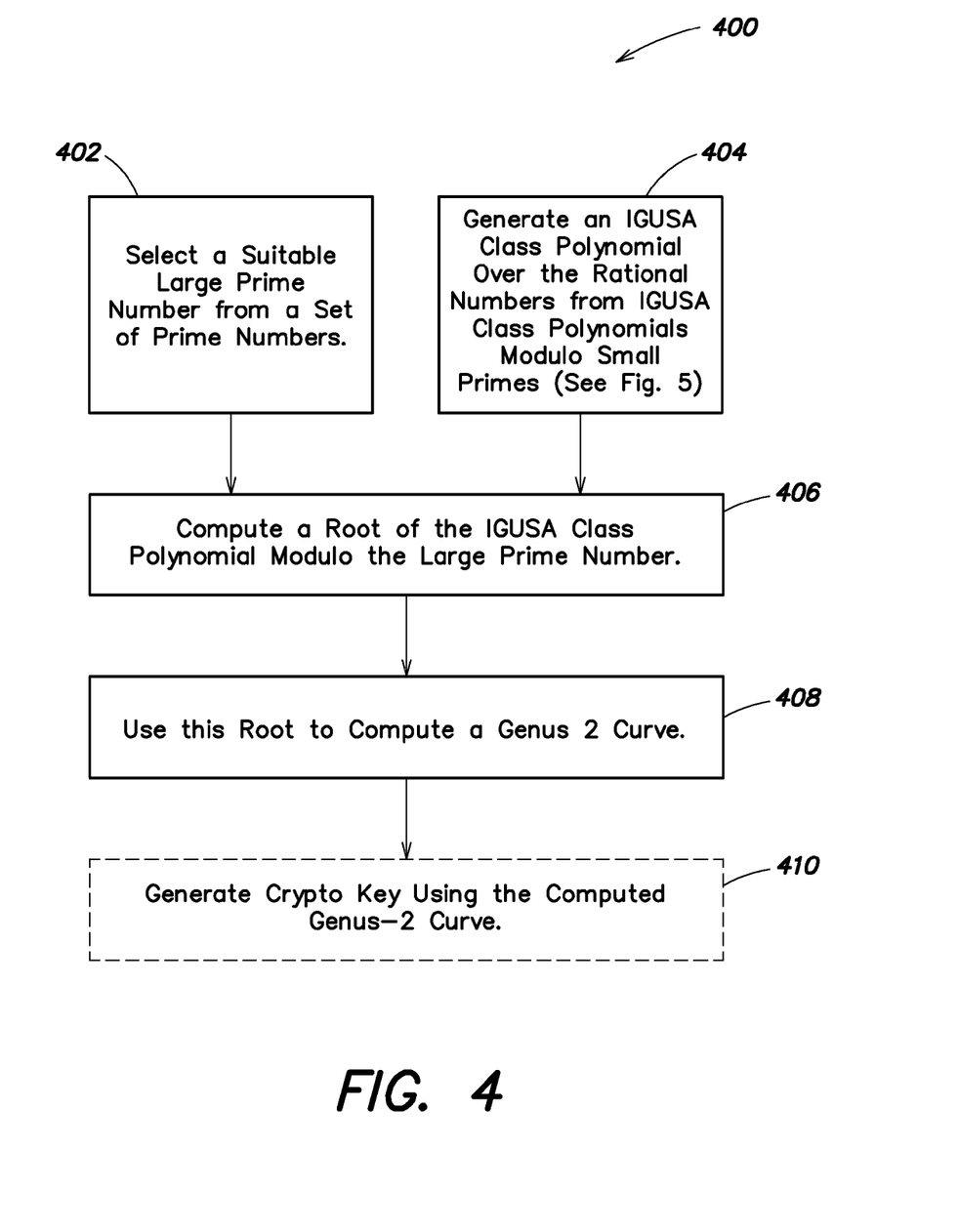
FIG. 4 is a flow diagram depicting an example embodiment of a process employing one embodiment of the cryptographic curve generation technique.

An example process 400 employing the cryptographic curve generation technique is shown in FIG. 4. As shown in FIG. 4, block 402, a suitable large prime number is selected from a predefined set of large prime numbers. An Igusa class polynomial over the rational numbers is generated from Igusa class polynomials modulo small primes, as shown in block 404. The process for computing this Igusa class polynomial from the Igusa class polynomials small primes is detailed in FIG. 5 and will be discussed in greater detail later. The large prime number selected from the predefined set of large prime numbers and the Igusa class polynomial are used to compute a root of the Igusa class polynomial modulo the selected large prime number, as shown in block 406. This computed root is then used to generate a genus 2 curve, as depicted in block 408. In one embodiment of the cryptographic curve generation technique the genus 2 curve is generated using Mestre's algorithm. Finally, the genus 2 curve can be used for various purposes, such as, for example, generating a crypto key, as shown in block 410.

Figure 5:
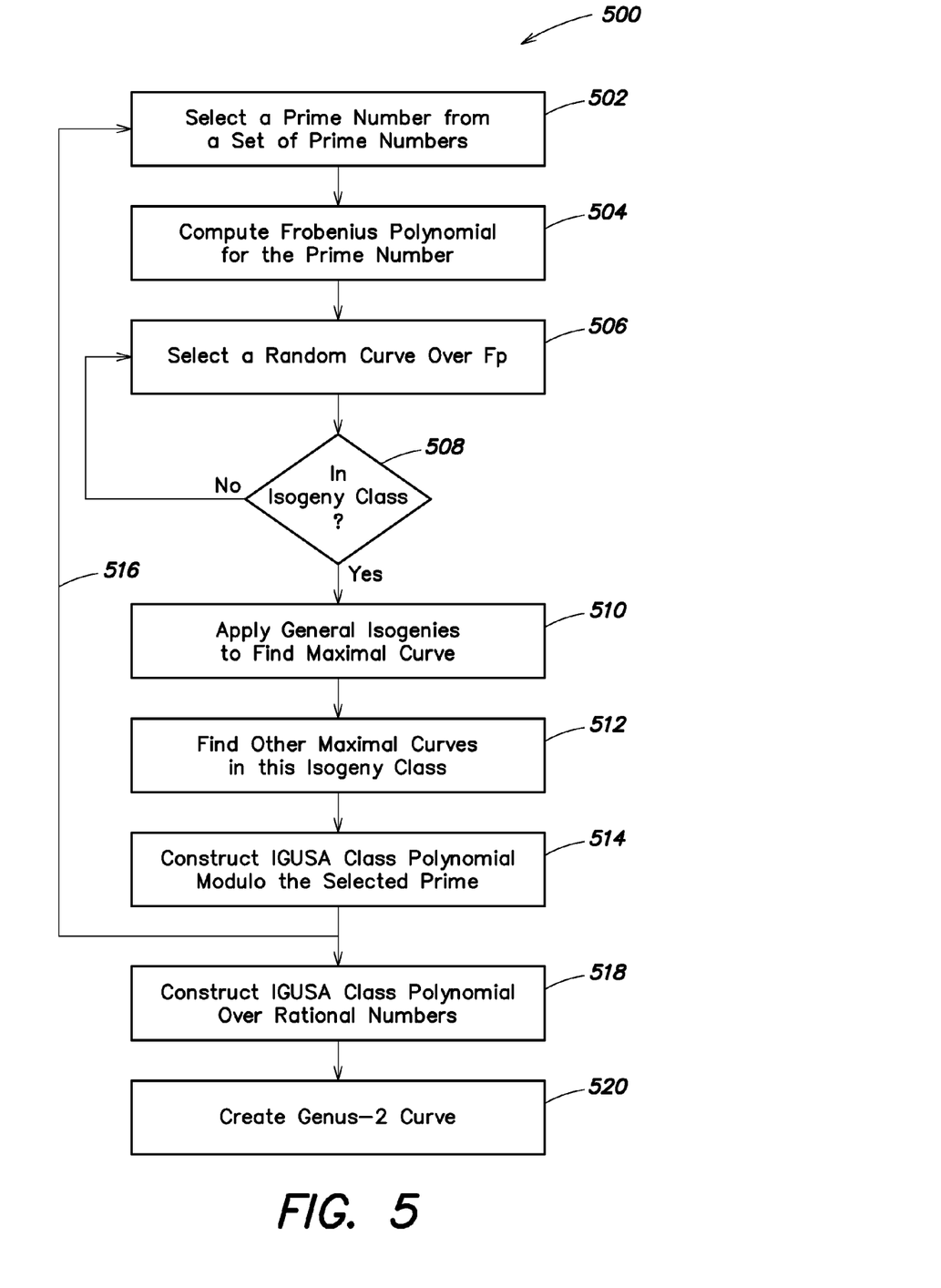
FIG. 5 is a flow diagram depicting an example embodiment of a process employing the cryptographic curve generation technique wherein an Igusa class polynomial over rational numbers is computed from a set of Igusa class polynomials modulo small primes.

FIG. 5 is another example process 500 of one embodiment of the cryptographic curve generation technique. This process involves computing an Igusa class polynomial over rational numbers from a set of Igusa class polynomials modulo a set of small primes. The set of Igusa class polynomials is computed modulo a set of small primes by finding all of the maximal curves in the isogeny class for each of the small primes in the following way.

In FIG. 5, a small prime number is selected (502) from a set of prime numbers. For cryptographic applications, the set includes about 100 small prime numbers, and small prime numbers of about one to four digits are sufficient. For the selected prime number, a characteristic Frobenius polynomial is computed (504). This polynomial defines the isogeny class for this prime number, which is a set of curves for which there are isogenies (a mapping between groups) among them, and that all have the same number of points. A random search is then conducted (506) to define a genus-2 curve over the field $F_p$, using conventional techniques. If this curve is not in the isogeny class for the selected prime (508), then the search is done again until a curve in the isogeny class is found. Given a curve in the isogeny class, isogenies of general degree are applied (510) to the curve until a curve with an endomorphism ring that is large as possible (a "maximal curve") is found in this isogeny class. An endomorphism ring is a set of mappings from a curve to itself. After the maximal curve in the isogeny class is found in 510, other maximal curves are found (512) by using isogenies of general degree to compute isogenous curves which also have the maximal endomorphism ring. From this set of maximal curves for the selected prime, an Igusa class polynomial modulo the selected prime is constructed (514). As indicated at 516, this process repeats for all the prime numbers in the set of prime numbers. A Chinese remainder approach is then used to construct (518) an Igusa class polynomial over the rational numbers from the computed set of Igusa class polynomials modulo the small primes. This Igusa class polynomial over the rational numbers can then be used to create (520) a genus 2 curve for cryptography.

Example implementations of the operations in FIG. 5 will now be described in more detail.

One way to identify (506) an initial genus-2 curve over the field $F_p$ is to loop through triples of Igusa invariants until a suitable curve is found, as described in U.S. Patent Publication 2010/0172491, hereby incorporated by reference. Another way to identify a curve is to represent a curve in Rosenhain normal form, which is possible if a function called the 2-torsion of the Jacobian of the curve is rational over $F_p$. The 2-torsion of this Jacobian is rational if a Frobenius element is trivial on it, which is the same as checking whether the element $(\pi-1)/2$ is contained in the maximal order. Then a curve is identified by looping through curves represented in Rosenhain form instead of Igusa triples. Another way to identify curves is to loop through Gundlach invariants instead of Igusa invariants. Another way to identify curves is to loop through curves after randomly selecting a monic sextic polynomial with coefficients in $F_p$, represented in Weierstrass form.

It is possible, however, that the isogeny class for the selected prime is small and step 506 could take a comparatively long time to result in one curve. To address this issue, the size of the isogeny class for a selected prime can be first estimated. This estimation can be done by using Lemma 6.3 of "A Hyperelliptic Smoothness test II," by H. W. Lenstra, Jr., J. Pila, and C. Pomerance, in Proc. London Math. Soc., (3) 84 (2002), pp. 105-146. If the estimated size for the isogeny class is too small, e.g., if not at least $p^{3/2}/16$ or some constant fraction of that, where p is the selected prime number, an attempt to find a curve in this class can be skipped and the next small prime can be selected.

However, it is also possible to estimate the size of the isogeny class, by using only the factorization of the index $[O_k:Z[\pi, \bar\pi]]$, where $O_k$ is a maximal ring and $Z[\pi, \bar\pi]$ are parameters of the Frobenius polynomial. In particular, for each prime l dividing the index, the extension degree for the $l^d$-torsion is computed. If this extension degree is too big, then the $l^d$-torsion will be too difficult to compute, and therefore this prime is skipped. If the extension degree is small enough to compute the $l^d$-torsion, then l can be skipped if l is too big or if there are no (l, l)-isogenies. An extension degree of around 1000 has been found to be a good threshold for cryptographic purposes. However, l can still be used if there are lots of curves in the isogeny class with endomorphism ring which is already maximal at l.

In 506, one implementation for finding the maximal curve is the following. Given a curve in the isogeny class, and generators $\{\alpha_i/l^{d_i}\}$ for the maximal order $O_k$ over the subring $Z[\pi,\bar\pi]$, as in Proposition 3.8 of "A CRT algorithm for constructing genus 2 curves over finite fields," by D. Freeman and K. Lauter, in Algebraic Geometry and its Applications, World Scientific (2008), pp. 29-66, then the image of the $l^{d_i}$-torsion under $\alpha_i$, $S_0 = \alpha_i(J[l^{d_i}])$ is computed. If $S_0$ is trivial (i.e., a set consisting of the element 0) then the element $\alpha_i/l^{d_i}$ is an endomorphism and processing moves on to the next generator. If not, another isotropic subgroup S of the $l^d$-torsion with non-trivial intersection with $S_0$ is taken, and the isogeny is computed with that kernel, checking that generators which were already endomorphisms are not lost in the process, to avoid cycles.

Both of the processes of finding a maximal curve in an isogeny class from one curve in the isogeny class, and of finding other maximal curves in a class from one maximal curve in the class, are similar. However, in the case where the initial curve is a maximal curve (as in 508), there are additional steps that can be performed to improve computation. In particular, a Shimura class group associated to a primitive quartic complex multiplication field K is precomputed and can be used for all primes when using the Chinese remainder theorem. Generators for the group and norms of the ideal representatives are computed. For each suitable representative ideal of the prime norm l, if (l, l)-isogenies exist and l is not too large, then the corresponding (l, l)-isogenies are applied up to the order of that component in the group. However, if the prime norm l divides the index $[O_k:Z[\pi, \bar\pi]]$, i.e., without a remainder, then the image of the corresponding (l, l)-isogeny may not be a maximal curve. In that case, after the isogeny is applied, the $l^d$-torsion is again computed, along with the action of the generators of $(O_k)_l$ over $Z[\pi, \bar\pi]_l$.

Figure 6:
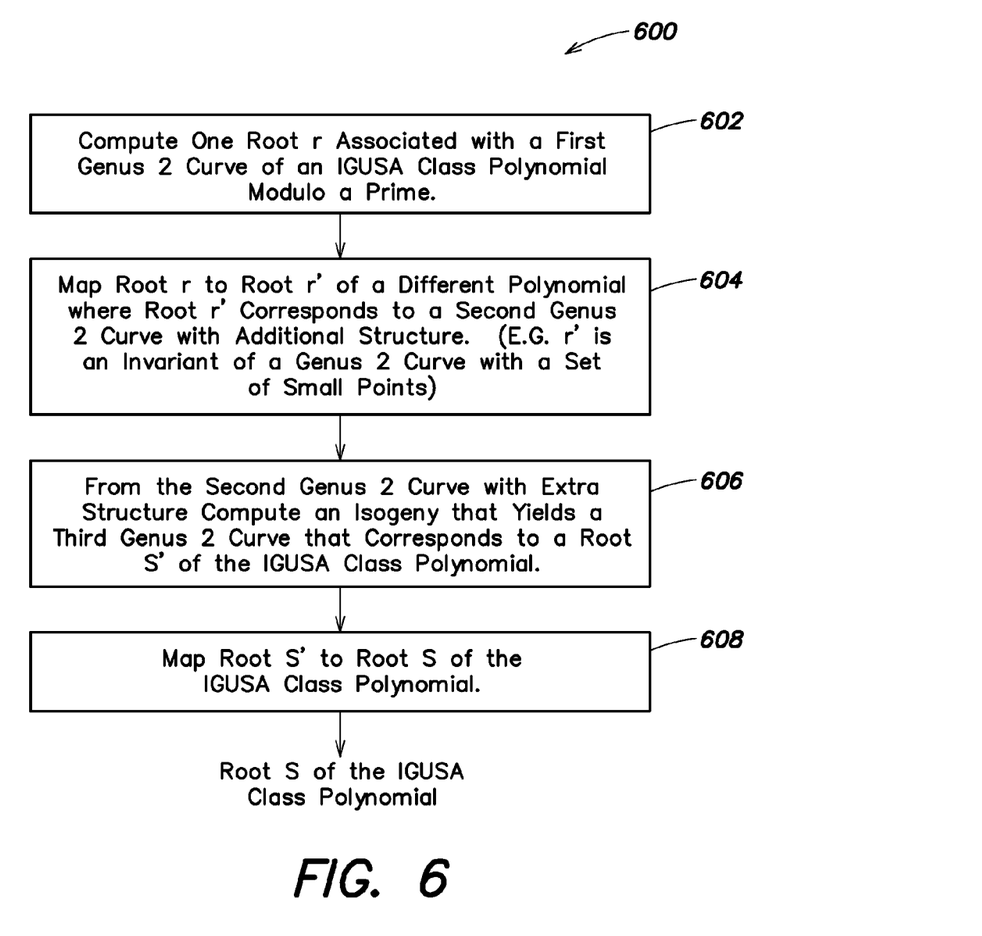
FIG. 6 is a flow diagram depicting an example embodiment of a process employing one embodiment of the cryptographic curve generation technique where one root of an Igusa class polynomial is found and other roots are found by mapping isogenies using a small modular function.
Figure 7:
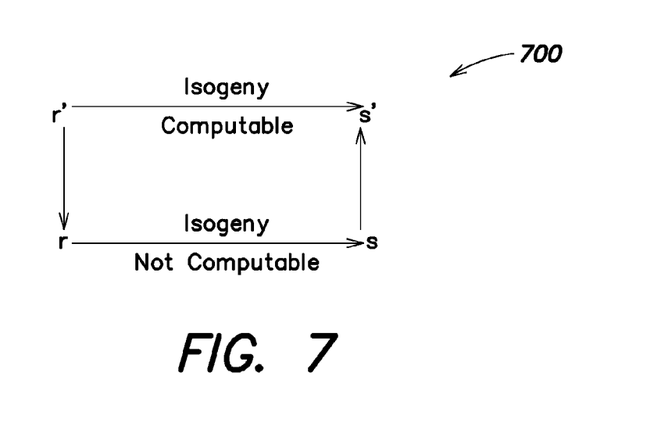
FIG. 7 is a diagram mapping one root of an Igusa class polynomial to another root in an example embodiment of a process employing the cryptographic curve generation technique.

FIG. 6 depicts an example process 600 employed for step 512 whereby the roots of the Igusa class polynomial modulo a prime are computed, given the first root. As shown in block 602, a first root r of an Igusa class polynomial modulo a prime, associated with a genus 2 curve, is computed. Typically this is done in the manner described above by finding a first maximal curve in the isogeny class for the prime number. Referring to block 604, once the first root r is found, this root is mapped to root r' of a different polynomial where root r' corresponds to a second genus 2 curve with additional structure (additional points on the curve). From the second genus 2 curve with additional structure, an isogeny that corresponds to a root s' of a polynomial is computed, as shown in block 606. Finally, the root s' is mapped to the root s of the Igusa class polynomial, yielding root s of the Igusa class polynomial, as shown in block 608. To find all the roots of the Igusa class polynomial, the technique applies this core algorithm many times: once for every root. FIG. 7 graphically depicts this process 700. Appendix A, Algorithm 6.2 of U.S. Patent Publication 2010/0172491 gives an advanced mathematical description corresponding to this process. However, it has been determined that the manner of finding maximal curves as described in connection with FIG. 5 allows isogenies of general degree to be used.

Figure 8:
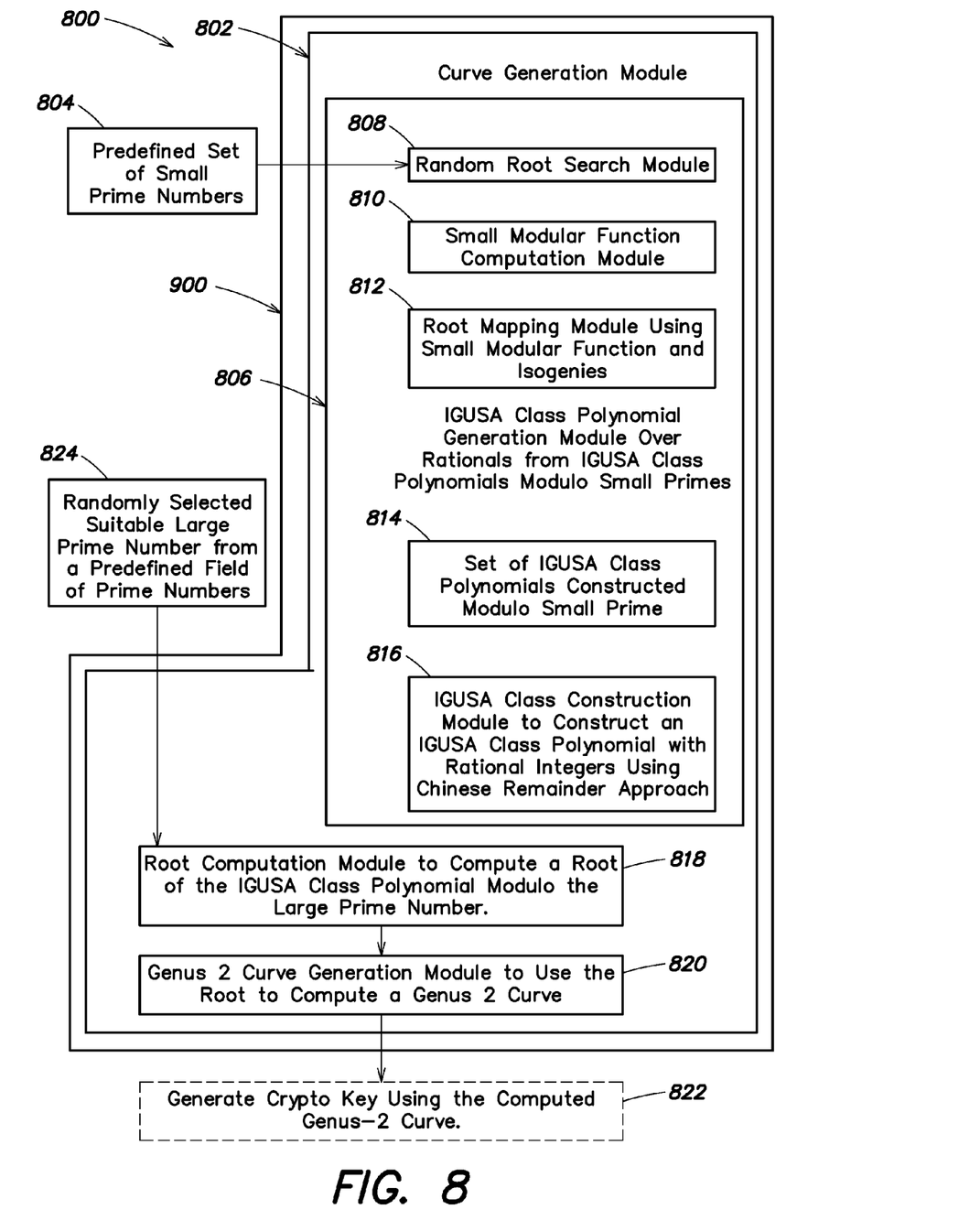
FIG. 8 is a diagram depicting one example architecture in which one embodiment of the cryptographic curve generation technique can be practiced.

FIG. 8, provides one example architecture 800 in which one embodiment of the cryptographic curve generation technique can be practiced. This architecture 800 includes a curve generation module 802, similar to curve generation module 152, previously described that resides on a computing device 900, such as will be described in more detail with respect to FIG. 9. As shown in block 804, a small prime number is selected from a predefined set of small prime numbers and this small prime number is input into an Igusa class polynomial generation module 806. A random root search module 808, performs a single random search to identify a first root of an Igusa class polynomial modulo the selected small prime number. A value of a small modular function is computed in a small modular function computation module 810, using the first root. (Mathematical details for computing this small modular function are described in Appendix A, Section A.4 of U.S. Patent Publication 2010/0172491) In block 812, a root mapping module, an isogeny is applied to the small modular function to find a new value of the small modular function. This new value of the small modular function is used to find the next root of the Igusa class polynomial. A check is made to determine if all roots of the Igusa calls polynomial are computed. If not, root mapping continues until all roots are computed. Once all roots are computed, an Igusa class polynomial construction module 814 constructs the Igusa class polynomial from the computed roots. This is repeated for several small prime numbers and as a result a set of Igusa class polynomials are constructed modulo small prime (block 814). A Chinese remainder approach is then applied to find the Igusa class polynomial over the rational numbers, as depicted in block 816. Once the Igusa class polynomial is found over the rational numbers, it is input into a root computation module 818, along with a randomly selected large prime number selected from a predefined field of large prime numbers. The root computation module 818 finds a first root of the Igusa class polynomial over the rational numbers. This root is then used to find a genus 2 curve in a genus 2 generation module 820 (e.g., via Mestre's algorithm). This genus curve can then be used for cryptography or for other purposes, such as, for example, generating a crypto key 822, or counting points on the Jacobian of this curve.

The cryptographic curve generation technique is designed to operate in a computing environment. The following description is intended to provide a brief, general description of a suitable computing environment in which the cryptographic curve generation technique can be implemented. The technique is operational with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 9:
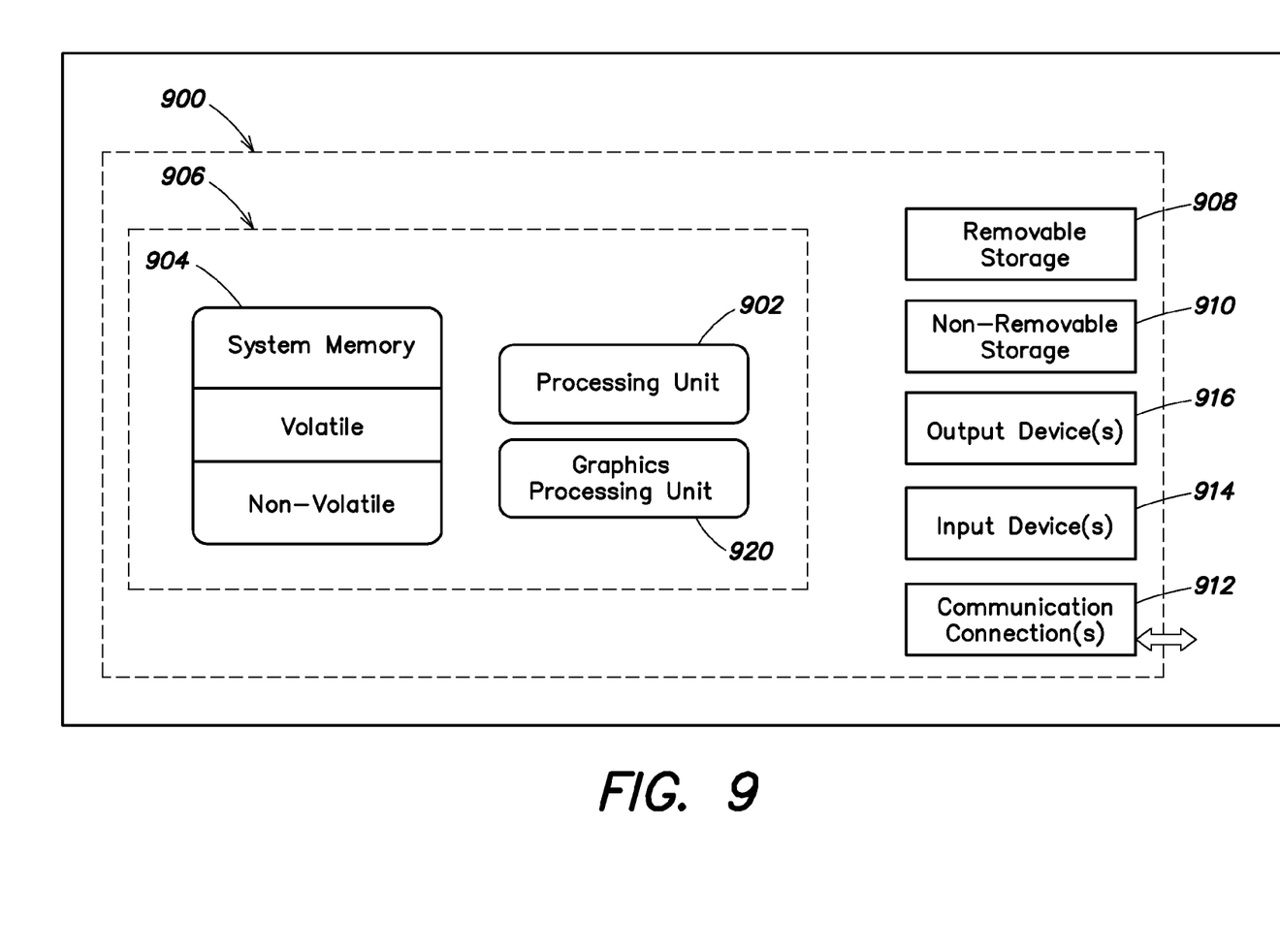
FIG. 9 is a schematic of an example computing device in which the cryptographic curve generation technique can be practiced.

FIG. 9 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the example operating environment. With reference to FIG. 9, an example system for implementing the cryptographic curve generation technique includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer program instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may also contain communications connection(s) 912 that allow the device to communicate with other devices. Communications connection(s) 912 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Device 900 may have various input device(s) 914 such as a display, a keyboard, mouse, pen, camera, touch input device, and so on. Output device(s) 916 such as speakers, a printer, and so on may also be included. All of these devices are well known in the art and need not be discussed at length here.

The cryptographic curve generation technique may be described in the general context of computer-executable instructions, such as program modules, being executed by a computing device. Generally, program modules include routines, programs, objects, components, data structures, and so on, that perform particular tasks or implement particular abstract data types. The cryptographic curve generation technique may be practiced in distributed computing environments where tasks are performed by remote processing devices that are linked through a communications network. In a distributed computing environment, program modules may be located in both local and remote computer storage media including memory storage devices.

Any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A system for generating a curve for use with cryptography, comprising:
    a general purpose computing device;
    a computer program comprising program modules executable by the general purpose computing device, wherein the computing device is directed by the program modules of the computer program to:
    for each prime number selected from a set of prime numbers:
        identify a curve in the isogeny class for the prime number,
        find an initial maximal curve in the isogeny class for the prime number by applying isogenies of general degree to the identified curve,
        find other maximal curves in the isogeny class by applying isogenies of general degree to the initial maximal curve, and
        construct an Igusa class polynomial modulo the prime number from the set of maximal curves for the prime number;
    generate Igusa class polynomials over rational numbers from the computed Igusa class polynomials modulo the set of prime numbers; and
    generate a genus 2 curve from the Igusa class polynomials over rational numbers.

2. The system of claim 1, wherein to identify a curve in the isogeny class for the prime number, the computing device is directed by the program modules of the computer program to:
    identify a Frobenius polynomial for the prime number which defines the isogeny class.

3. The system of claim 1, wherein to identify a curve in the isogeny class for the prime number, the computing device is directed by the program modules of the computer program to loop through curves defined in Rosenhain normal form.

4. The system of claim 1, wherein to identify a curve in the isogeny class for the prime number, the computing device is directed by the program modules of the computer program to loop through Gundlach invariants.

5. The system of claim 1, wherein to identify a curve in the isogeny class for the prime number, the computing device is directed by the program modules of the computer program to start with a randomly selected curve that is a monic sextic polynomial.

6. The system of claim 2, wherein to identify a curve in the isogeny class for the prime number, the computing device is directed by the program modules of the computer program to loop through curves defined in Rosenhain normal form.

7. The system of claim 2, wherein to identify a curve in the isogeny class for the prime number, the computing device is directed by the program modules of the computer program to loop through Gundlach invariants.

8. The system of claim 2, wherein the computing device is further directed by the program modules of the computer program to estimate a size of an isogeny class for the selected prime number.

9. The system of claim 8, wherein the computing device is further directed by the program modules of the computer program to skip the selected prime number and select another prime number if the estimated size of the isogeny class is too small.

10. The system of claim 1, wherein the computing device is further directed by the program modules of the computer program to estimate a size of an isogeny class for the selected prime number to skip the selected prime number and select another prime number if the estimated size of the isogeny class is too small.

11. A computer-implemented process for generating a curve for use in cryptography, comprising:
    for each prime number selected from a set of prime numbers:
        computing, using a computer processor, a curve in the isogeny class for the prime number,
        finding an initial maximal curve in the isogeny class for the prime number by applying, using a computer processor, isogenies of general degree to the identified curve,
        finding other maximal curves in the isogeny class by applying, using a computer processor, isogenies of general degree to the initial maximal curve, and
        constructing in a memory of a computer using a computer processor an Igusa class polynomial modulo the prime number from the set of maximal curves for the prime number;
    computing Igusa class polynomials over rational numbers using a computer processor from the computed Igusa class polynomials modulo the set of prime numbers; and
    generating using a computer processor a genus 2 curve from the Igusa class polynomials over rational numbers;
    making a representation of the genus 2 curve available in a computer memory for access by a cryptosystem.

12. The computer-implemented process of claim 11, further comprising, performing the following steps in a computer processor:
    computing a Frobenius polynomial for each prime number to define the isogeny class for the prime number.

13. The computer-implemented process of claim 11 wherein characteristics of the genus 2 curve are used to validate software.

14. The computer-implemented process of claim 11, wherein computing a curve in the isogeny class comprises looping through curves defined in Rosenhain normal form.

15. The computer-implemented process of claim 11, wherein computing a curve in the isogeny class comprises looping through Gundlach invariants.

16. The computer-implemented process of claim 12, wherein computing a curve in the isogeny class comprises looping through curves defined in Rosenhain normal form.

17. The computer-implemented process of claim 12, wherein computing a curve in the isogeny class comprises looping through Gundlach invariants.

18. The computer-implemented process of claim 12, wherein computing a curve in the isogeny class comprises starting with a randomly selected curve that is a monic sextic polynomial.

19. The computer-implemented process of claim 12, further comprising estimating a size of an isogeny class for the selected prime number.

20. The computer-implemented process of claim 19, further comprising skipping the selected prime number and selecting another small prime number if the estimated size of the isogeny class is too small.

* * * * *